United States Patent [19]

Yoshida

[11] Patent Number: 4,933,210
[45] Date of Patent: Jun. 12, 1990

[54] DURABLE ANTI-RUSTING METHOD

[75] Inventor: Masashi Yoshida, Itoo, Japan

[73] Assignee: Tadatomo Maruyama, Tokyo, Japan

[21] Appl. No.: 334,743

[22] Filed: Apr. 6, 1989

Related U.S. Application Data

[63] Continuation of Ser. No. 107,707, Oct. 9, 1987, abandoned.

[51] Int. Cl.$^5$ .......................... B05D 5/00; B05D 3/00
[52] U.S. Cl. .................................... 427/160; 427/299; 427/325; 427/393.6; 427/421
[58] Field of Search ........................... 424/26, 32, 114; 427/299, 325, 421, 160, 393.6

[56] References Cited

U.S. PATENT DOCUMENTS 4,008,351  2/1977  Inoue et al. .......................... 428/411

*Primary Examiner*—Janyce Bell
*Attorney, Agent, or Firm*—Jordan and Hamburg

[57] ABSTRACT

An anti-rusting composition in solution form is prepared by dissolving anti-rusting agent in an organic solvent having a permeability greater than water, mixing the solution with a permeable water-proofing agent dissolved in a petroleum based solvent. The anti-rusting composition in solution form is applied to the surface of a desired material and the anti-rusting and water proofing agents permeate into the material from the surface thereof through capillary walls. When the solvent evaporates, a gel layer forms and a strong water-proof layer is obtained to isolate the air phase from the material.

8 Claims, 2 Drawing Sheets

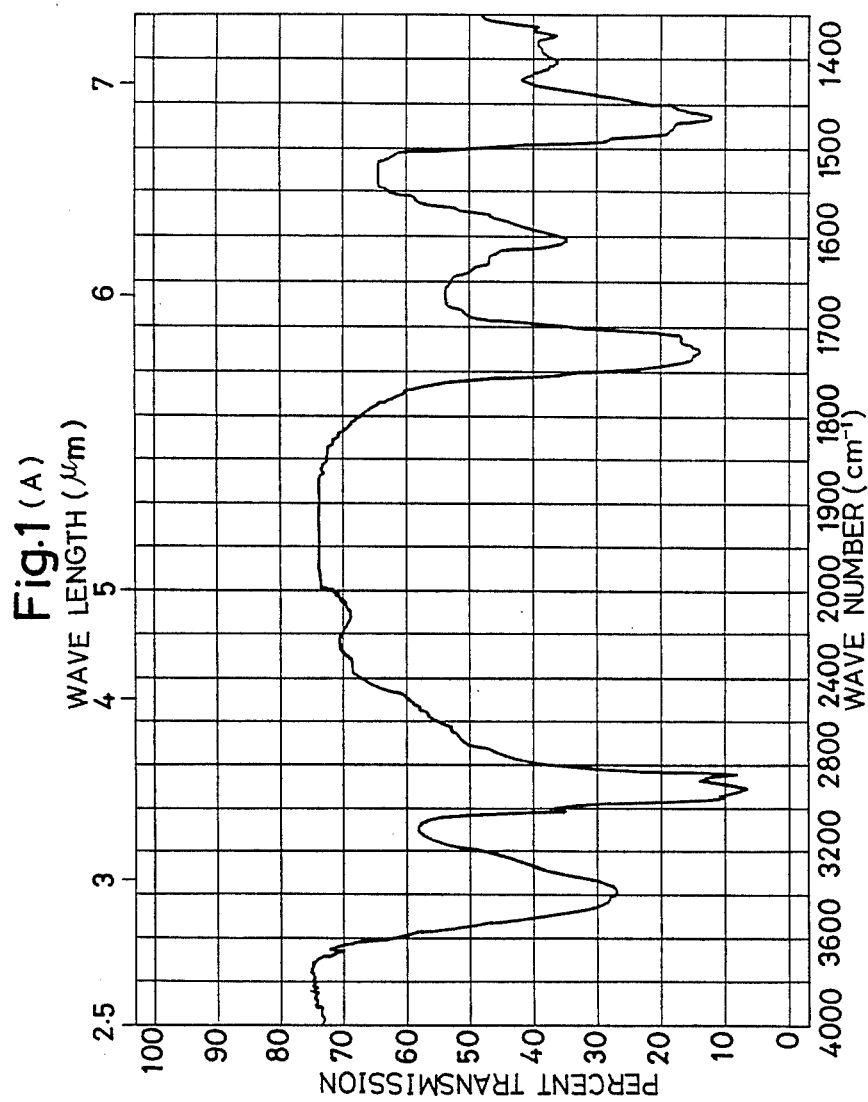

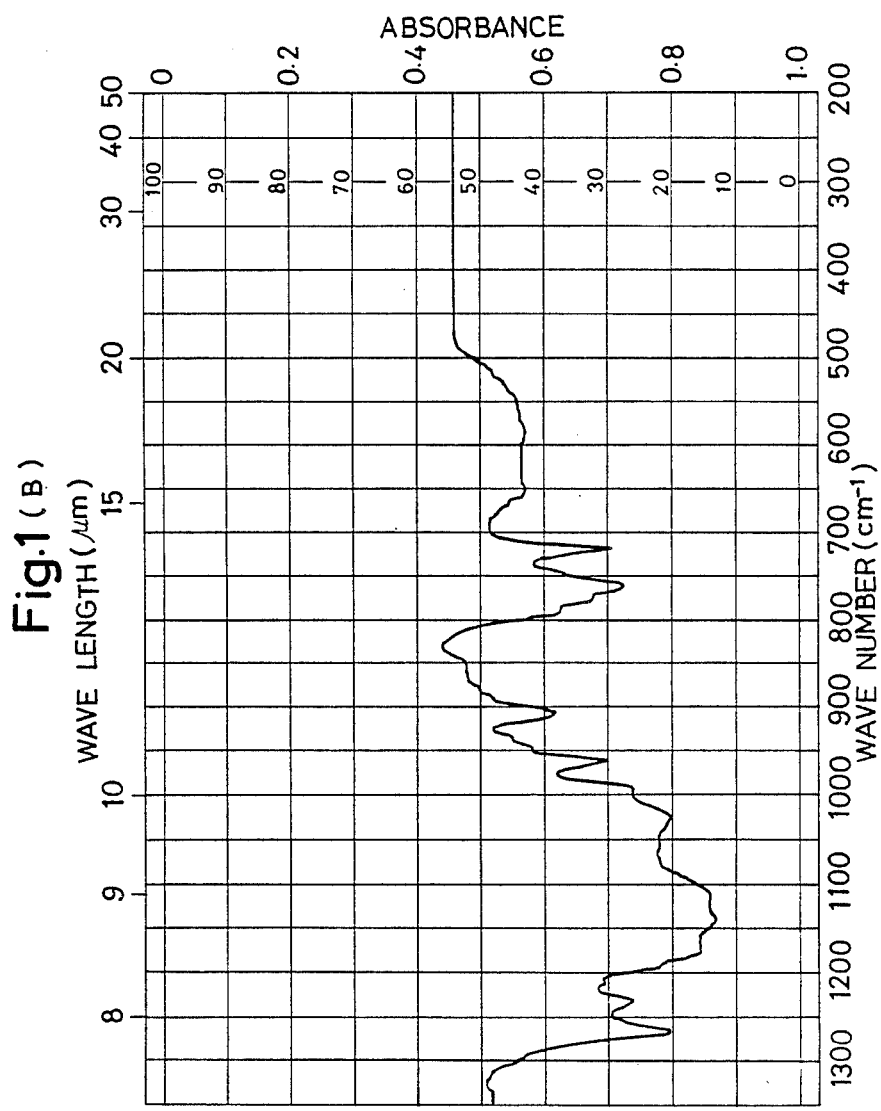

DURABLE ANTI-RUSTING METHOD

This application is a continuation of application Ser. No. 107,707, filed Oct. 9, 1987 now abandoned.

FIELD OF THE INVENTION

This invention relates to a durable anti-rusting method adaptable for general building structures and, more particularly, to a durable anti-rusting method, which provides an excellent bonding property and anti-rusting effect for bath room tile surfaces, plastic boards, and so forth.

DESCRIPTION OF THE PRIOR ART

Recently, adverse effects of rust on building structures is increasing greatly and seriously influencing daily life. This is thought to be attributable to the fact that with an increase of the variety of construction materials, a variety of materials which permit ready rustting have been used for subordinate works of construction such as painting works, cloth application works and fiber wall coating works. Another conceivable cause is that life styles have been greatly changed recently with the spread of room heating so that the winter season can be passed under warm conditions. As is well known in the art, conditions suited for rusting are (1) adequate temperature (20° to 30° C.), (2) adequate relative humidity (70 to 80%), (3) rich nutrition and (4) adequate supply of oxygen. It is presumed that adhesive resins, paper, cloth, etc. which are incorporated in the paints used for the painting works and adhesive glues used in cloth application works and are also used for fiber wall coating works, contain the nutrition and temperature conditions suited for the growth of rust, and such are provided even in the winter season, in which the growth of rust had earlier been suppressed. Of course, the damage due to rust in building structures is not limited to places where there is rich nutrition. Much rusting can be observed in bath rooms, particularly tile surfaces thereof, where air ventilation is inferior, and the removal of rust is a very distressing problem.

It has been made obvious that oily paints, lacquers, silicon resin paints, polyurethane resin paints, epoxy resin paints, emulsion paints, and so forth which have heretofore been extensively used for building interior and exterior works permit ready propagation of rust and bacteria. For the prevention of rusting, various painting tests have been made using a variety of anti-rusting agents. At present, however, there is substantially no rusting anti-rusting agent, which guarantees an anti-rusting effect for long time when used for anti-rusting work in the construction of a building.

SUMMARY OF THE INVENTION

Based on experiments, long experience and the knowledge it has been determined that the coating formed by the prior art paint is only a superficial film, that the coating is readily separable that many spots are formed at the time of the painting, and that such readily separable portions and spots of the coating constitute a base of propagation of rust and/or bacteria and spread damage, so that effective anti-rusting can not be obtained. According to the invention, this problem is overcome by an anti-rusting solution which is prepared and used as follows: dissolve an appropriate anti-rusting agent in an organic solvent as dilution agent having a permeable property, mix the resultant solution with a permeable water-proof agent containing a water-proof component dissolved in a petroleum-based solvent and provide the resultant mixture on the surface of the intended material by spraying or coating. It has been found that the anti-rusting solution permeates into the intended material from the surface thereof through capillary walls, and the water-proofing agent similarly permeates. After evaporation of the solvent a gel layer is formed by chemical reactions in and on the surface of the permeated portions of the material. A strong water-proof layer is thus obtained to isolate the air phase. Thus, it is possible to obtain a durable anti-rusting effect. The present invention is predicated in this finding.

BRIEF DESCRIPTION OF THE DRAWINGS

FIG. 1(a) and FIG. 1(b) are an infrared absorption spectrum of "Chemstop".

DESCRIPTION OF THE PREFERRED EMBODIMENT

Now, various anti-rusting agents which are used for the durable anti-rusting method according to the invention as well as permeable waterproof agents and diluting solvents and their contents will be described.

The anti-rusting agent or germicide which is used for the anti-rusting method according to the invention is selected by a first condition that has a low toxicity, not stimulative, free from harmful effects on the skin and the eyes, has strong rust growth prevention effect and also has an anti-corrosion effect. The anti-rusting agent or germicide is also recognized to be stable and capable of providing a continuous effect when it is added to the permeable water-proof agent as an essential prerequisite of the invention and be incapable of decomposition by light or heat. Germicide which can meet the above various conditions will now be described.

1. Anti-rusting agent according to the invention (1) 2-(4-thiazolyl)-benzimidazole It is abbreviated as thiabendazol or T.B.Z. It is in the form of light yellow powder and has a chemical structure of

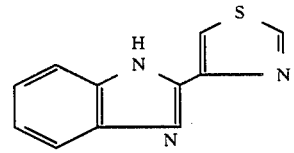

As is seen from this formula, it is a substance of very low virulence and free from any metal or chlorine component in the molecule. It is chemically stable and undergoes hydrolytic decomposition with difficulty. It is not decomposed even at 300° C. Its acute toxicity $LD_{50}$ is 3,600 mg/kg (oral). As for its chronic toxicity, endemic toxicity and stimulus to the skin and eyes, it is evaluated to be a germicide of very high safety from 10-year test result data. It is said to have the effect of preventing the growth of rust, which grows in paints or like agents, in as low a concentration as 0.2 to 25 ppm.

(2) Dibenzylbromoacetate

It is a liquid anti-rusting agent having a chemical structure of

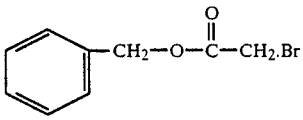

and a specific gravity of 1.43 to 1.48. It is mixed will with benzene and toluol. It can prevent growth of rust in 5 to 15 ppm and growth of bacteria in 1 to 5 ppm. It is stable under acidic and alkaline conditions.

(3) N-(fluorodichloromethylthio)-phthalimide

This agent has a chemical structure of

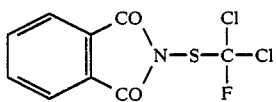

and is in the form of a white powder. It is suited to be incorporated in a solvent-based paint. It is used for paints in amounts of 1.5 to 2.5 weight % with respect to the solid component. It has an acute oral toxicity $LD_{50}$ of 2,500 mg/kg.

(4) N-dimethyl-N'-phenyl-N'-(fluoro-dichloromethylthio)-sulfamide

It has the chemical structure of

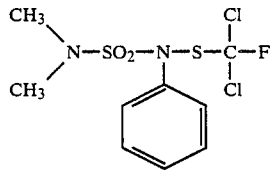

and is abbreviated as prebenthol A4. Among like anti-rusting agents, it is low in toxicity and has a nature such that it will not cause stains in the coating film. It is suited as an additive in solvent-based paints. It has germecidal power with respect to a wide variety of rust, bacteria and yeast, so that it is suited for interior painting.

2. Permeable water-proof agent and diluting agent

When carrying out the durable anti-rusting method according to the invention, one or more presently used effective anti-rusting agents are dissolved in an organic solvent, which is an adequate diluting agent, and the solution thus obtained is provided by coating or spraying on the intended material. As the solvent, an organic solvent which generally has higher solubility and permeability than water is suitable. Particularly, hydrophobic solvents which are superior in permeability, so that toluene is used in the method according to the invention. However, it is possible to use benzol and other aromatic solvents. Lacquer thinner, i.e. an organic solvent having a solubility and permeability greater than water such as that containing 60 to 70% of toluene, is particularly preferred for use in the method according to the invention. The lacquer thinner used can dissolve the anti-rusting agents noted above used in accordance with the invention and may be provided in the form of a solution containing at least 0.5% of anti-rusting agent.

In accordance with the invention the lacquer thinner solution containing at least 0.5% of anti-rusting agent is provided on the intended material for deep permeation. At the same time, a permeable water-proofing agent diluted by lacquer thinner is provided together with, i.e., in the form of a mixture with the lacquer thinner solution of anti-rusting agent noted above to form a film inside the intended material. Thus, it is possible to provide an anti-rusting method, which provides for extremely superior durability to the anti-rusting durability obtainable with ordinary paint.

The permeable water-proof agent noted here is composed of a petroleum-solvent solvent and a paraffin or aromatic-based mixture and a plurality of water-proof resins mainly constituted by non-silicon water-repelling resins. When this agent is provided on such material as wood, concretes, mortar, blocks, bricks, baked tile and plastic materials, it deeply permeates into the material, and after evaporation of the solvent a gel layer is formed by chemical reactions along capillary walls and surfaces of the material, thus providing a strong water-proof effect providing for excellent weather-proof and contamination-proof properties. A typical example of this agent is "Chemistop" (a trade name by Mitsui Sekiyu Kagaku Kogyo Co., Ltd.). Its quality standards are set forth in the Table below.

| | Quality Standards Table | | |
| Kind | CM-R | CM-HD | CM-SL |
| --- | --- | --- | --- |
| Specific gravity d 20/40 | 0.83 or below | 0.83 or below | 0.92 or below |
| Color phase APHA | 100 or below | 100 or below | 200 or below |
| Viscosity CST | 2.0 or below | 4.0 or below | 4.0 or below |
| Solid component wt % | 4.0 to 5.0% | 6.5 to 7.5% | 19 to 21% |
| Ignition point tug closure system | 27° C. | 24° C. | 23° C. |

The lacquer thinner used in the method according to the invention can be used together with a petroleum-based solvent of the permeable water-proof agent, and the two can be used in any desired proportions.

In order to obtain an excellent durability effect with the durable anti-rusting method according to the invention, it is necessary to dilute and permeable water-proof agent together with the anti-rusting agent noted above using lacker thinner to obtain a perfect solvent for use. More specifically, a dilution degree should be set, which corresponds to the density or adsorption capacity of the intended material to be anti-rusting treated. Generally, when the dilution degree is high, the agents are absorbed well by and held in close contact with the intended material, so that the film is more difficultly separable. This effect corresponds to the effect of a primer used in an adhesive. If lacquer thinner is used in a quantity of about ten times the quantity of the sum of permeable water-proof agent and anti-rusting agent, the resultant system can be sufficiently held in close contact with the surface of the plastic material and is never separated. The excellent adhesion of the anti-rusting treatment liquid according to the invention is one feature of the present invention. Further, when a system with a dilution degree of three times in volume is coated on the wood surface, the natural character of wood can be maintained, making it difficult to judge by visual inspection as to whether there is a coating. As for the plastic material, separation and flow-out are liable if the dilution degree is two times or less.

Standards of the intended material to be treated and the dilution degree (volume) are as follows. Where the intended material is bricks or stone boards, the dilution degree, i.e., the volume ratio of the sum of the permeable water-proof agent and anti-rusting agent to lacquer thinner is sufficient at 1:1. Where the intended material is concrete or ricin, the dilution degree is sufficiently 1:2. Where the material is plastics, wood, wall members or cloth, a sufficient degree of dilution ranges from 1:3 to 1:10.

When providing the durable anti-rusting treatment by the method according to the invention, it is necessary to carry out in advance a primary disinfection by spraying of calcium perchlorite and a secondary disinfection by using alcohol or benzalconium chloride. These disinfections should be done when damage by rust already produced can not be recognized by visual inspection, as well as when the damage is recognizable.

Examples of the invention will be given below.

EXAMPLE 1

With an aim of comparing the method according to the invention and the prior art method, anti-rusting treatment was done by the standard method according to the invention for a bath room which contains concrete portions finished with ricin and other portions. In the mean time, a prior art paint containing the same concentration of the same anti-rusting agent was coated using the same amount. After the coating, the coated surfaces were held for a fixed period of time. Then, the state of growth of rust was observed by a method of visually comparing both the coated surfaces. In both of the methods, the preliminary disinfection process was effected prior to the coating.

A. Method of provision

1. Preparation of anti-rusting liquid (1) According to the invention 20 g of T.B.Z. and 20 g of Prebenthol A4 were weighed as the anti-rusting agent and were mixed with 1,000 ml. of a permeable water-proof agent (i.e., "Chemistop" by Mitsui Sekiyu Kagaku Kogyo Co., Ltd.). Then, approximately 4,000 ml. (i.e., approximately 3,480 g) of lacquer thinner was added to the mixture, and the admixture was agitated well to prepare a total amount of approximately 5,000 ml. (i.e., approximately 4,250 g) of approximately 0.94% solution of anti-rusting agent.

(2) According to the prior art 20 g of T.B.Z. and 20 g of Prebenthol A4 were weighed as the anti-rusting agent. 1,000 ml. of vinyl chloride-based resin paint was added to the mixture. Further, approximately 4,000 ml. (i.e., approximately 3,480 g) of lacquer thinner was added, and the resultant system was agitated well to prepare a total amount of approximately 4,550 g of a 0.94% solution of anti-rusting agent.

2. Method of coating

The anti-rusting liquid according to the invention and that in the prior art method were coated on ricin-finished bath room walls in an average amount of 66.6 ml. (i.e., approximately 57.9 g) per 1 m².

B. Results of coating

The coated surfaces were left for two years, and then the status of rusting on the treated material was visually compared on the basis of the following standards. The results are shown in Table 1.

Standards of visual inspection

Six grades of rusting status are represented by symbols given below.
Status of rusting
Rusting is not recognized at all
Hyphae are recognizable only by using a microscope.
Hyphae are recognizable by the naked eye.
The quantity of hyphae is slightly greater
The quantity of hyphae is further greater
The quantity of hyphae is very large, so that the anti-rusting effect is not recognizable.

TABLE 1

|  |  | Kind of treatment | |
| --- | --- | --- | --- |
| Place of treatment | material to be treated | Treatment according to the invention | Treatment using prior art paint |
| Bath room | Wood | — — — | — |
|  | Concrete (ricin-finished) | — — — | + |
|  | Tile surface | — — — | — |
| wall |  | — — — | — — — |
| Western style room(cloth-finished) |  | — | — |

EXAMPLE 2

This example was performed in a villa residence (in Amegi Plateau) in the neighborhood of the inventor's residence area (Ito City, Shizuska Prefecture), a general dwelling with a hot spring (in Ito City) and a dormitory (in Izu Plateau). In each of these places two buildings were selected to carry out on the same a method, which was carried out by usual method by local rust-prevention dealers in the area and method according to the invention (as in Example 1). The status of rusting was judged on the basis of the visual inspection standards explained before in connection with Example 1 one year and two years after the treatment was made.

The prior art method which is carried out as the ordinary method is as follows. The order of steps performed in case when there is already rust in a bath room or the like is (1) oxidization and bleaching a well-known suitable oxidizing and bleaching agent, (2) disenfection using ethanol or benzalconium chloride and (3) painting with a paint containing anti-rusting agent.

The method according to the invention is the method of Example 1.

The place of treatment is the bath room. Table 2 shows the status of rusting on wood, silicon-finished concrete, tile surface, Izu stone, plastic ceiling and unit bath joint.

TABLE 2

|  |  | Processes compared | | | |
| --- | --- | --- | --- | --- | --- |
|  |  | Process according to the invention | | Prior art process | |
| Place of treatment |  | after one year | after two years | after one year | after two years |
| Bath room | Wood | — — — | — — — | + + | + + + |
|  | Concrete | — — — | — — — | — — | — |

TABLE 2-continued

| Place of treatment | Processes compared | | | |
|---|---|---|---|---|
| | Process according to the invention | | Prior art process | |
| | after one year | after two years | after one year | after two years |
| (ricin-finished) Tile joint | --- | --- | – | ++ |
| Izu stone | --- | --- | ++ | +++ |
| Plastic ceiling | --- | --- | ++ | +++ |
| Unit bath joint | --- | --- | + | ++ |

From the results of tests in Example 1 it is recognized that the result of treatment by the method according to the invention is set apart substantially by a couple of grades from the result of treatment of an anti-rusting paint containing the same amount of the same anti-rusting agent. It is judged that there is obviously a difference between the two methods. It is also found from the results of Example 2 that the difference between the two methods is more pronounced.

The content of the anti-rusting agent in the prior art anti-rusting paint, although it is not announced, is estimated from the solubility to be in a range of 0.5 to 1%. Such prior art anti-rusting paint is prone to spots in and separation of the coating, and an effect for only about six months is guaranteed with the bath room in a high temperature, high relative humidity hot spring zone as in Example 2.

A 5% anti-rusting agent, which contains paint and anti-rusting agent in a weight ratio of 1,000:50, with 30 g of T.B.Z. and 20 g of Prebenthol A4 being a maximum content with respect to 1 kg of the prior art paint, provided a far inferior result compared to the anti-rusting paint containing 1% of anti-rusting agent prepared by the method described before in connection with Example 1.

Hereupon, FIG. 1(*a*) and FIG. 1(*b*) showing and infrared absorption spectrum of "Chemistop" are annexed as reference material.

In these FIGS. 1(*a*) and (*b*), a wave length range of 500 to 2,000 m$\mu$ indicates the presence of alkyd resin, and a range of 2,000 to 3,600 m$\mu$ represents the presence of epoxy resin.

What is claimed is:

1. A method of providing durable anti-rusting proofing to a building construction material used in the construction of buildings and wherein said building construction material has an outer surface and capillary walls, comprising mixing an anti-rusting agent selected from at least one member of the group consisting of 2-(4-thiazolyl) benzimidizole, dibenzylbromoacetate, N-(fluorodichloromethylthio) phthalimide, and N,N-dimethyl-N'-phenyl-N'-(fluorodichloromethylthio) sulfamide and a permeable water proofing agent composed of a plurality of water-proof resins constituted principally by non-silicon water-repelling resins in a petroleum based solvent and a paraffin or aromatic based solvent mixture having an infrared absorption spectrum as set forth in FIGS. 1(A) and 1(B), diluting the resulting mixture with an organic solvent containing at least 60 to 70% toluene, coating said outer surface of said building construction material with the diluted mixture of anti-rusting agent and water-proofing agent, permeating said diluted mixture into said building construction material from said outer surface through said capillary walls, and forming a gel layer by chemical reactions of said diluted mixture in and on the surface of the permeated material after evaporating said solvent, thereby resulting in a strong waterproof layer isolating an air phase and providing a durable anti-rusting effect.

2. The method according to claim 1, wherein said anti-rusting agent is composed of 2-(4-thiazolyl)benzimidizole and N,N-dimethyl-N'-phenyl-N'-(fluorodichloromethylthio)sulfamide.

3. The method according to claim 1, wherein the anti-rusting agent is present in the solution in a concentration of at least 0.5% with respect to the resulting mixture after dilution.

4. The method according to claim 1, wherein the mixture of anti-rusting agent and permeable water proofing agent is diluted with the organic solvent in an amount such that the volume ratio of said mixture to said organic solvent is in the range of 1:1 to 1:10.

5. The method according to claim 1, wherein the diluted mixture of anti-rusting agent and water proofing agent is coated on said material by spraying or painting.

6. The method according to claim 1, wherein the material is subjected to preliminary disinfection by oxidizing and bleaching treatment prior to coating the material with the diluted mixture of anti-rusting agent and water proofing agent.

7. The method according to claim 1 further comprising diluting each of said anti-rusting agent and said water-proofing agent in said organic solvent prior to mixing.

8. The method according to claim 1, wherein said building construction material is selected from the group consisting of wood, brick, stone, concrete and tile.

* * * * *